UNITED STATES PATENT OFFICE.

JOSEPH M. JOHNSON, OF LEWISTON, MAINE.

COMPOSITION FOR STOPPING LEAKS.

981,429.

Specification of Letters Patent. Patented Jan. 10, 1911.

No Drawing.

Application filed January 6, 1910. Serial No. 536,629.

*To all whom it may concern:*

Be it known that I, JOSEPH M. JOHNSON, a citizen of the United States, and a resident of Lewiston, in the county of Androscoggin and State of Maine, have invented a new and Improved Composition for Stopping Leaks, of which the following is a full, clear, and exact description.

My invention relates to a composition for stopping leaks in automobile engines, radiators, boilers, water tanks, water pipes, and various other devices which are subjected to the action of warm water or steam. I do not limit myself, however, to any particular use for the composition, as it may be employed in many relations in connection with various arts.

More particularly stated, I mix together certain ingredients as hereinafter described, so as to form a dry material which is next boxed and labeled, ready for the market.

In preparing the composition I use the following ingredients, in the proportions by weight stated: iron filings, 25%; sulfate of iron, 5%; rye meal, 33⅓%; graphite (powdered), 16⅔%; red lead, 10%; powdered asbestos, 10%. I also use a quantity of muriatic acid (preferably about one pound of acid of ordinary commercial strength to ten pounds of iron filings). The acid forms no part of my composition and is employed merely in the treatment of the filings. For purposes of the composition the acid may be neglected.

I first place the iron filings in a suitable vessel and pour the muriatic acid upon them. This is for the purpose of removing any grease or oil from the filings. Since, however, the muriatic acid does no harm, I allow it to remain. I next add the sulfate of iron and the powdered asbestos, placing these ingredients in a mixer, which is actuated by power for a period of about two hours. This mixes the ingredients into a homogeneous mass. The other ingredients are then mixed together by hand and added, after which the entire mass is agitated for a period of two hours. This gives us a dry mass of apparently homogeneous powder which is ready for use.

The composition above described is used in various ways. It may be mixed with hot water and applied to the outside of pipes for the purpose of closing leaks therein. For stopping leaks in automobile radiators, engines and boilers, the material in a dry form is turned directly into the water in the radiator or boiler. After this the engine is started and the automobile run on the road for at least fifteen minutes. By this time the leak is closed. The circulation of the water carries the mixture to the leak, and the mixture effectively closes the leak.

The composition above described may be used where it is impossible to stop a leak in any other way. It may be applied to the outside of almost any sort of pipe, being bound or tied on by aid of tire tape. Leaks in gasolene pipes can readily be stopped in this manner.

Having thus described my invention, I claim as new and desire to secure by Letters Patent:

1. The composition above described, containing iron, sulfate of iron, rye meal, graphite, red lead, and asbestos.

2. The composition above described, containing the following ingredients in the proportions by weight stated: iron 25%, sulfate of iron 5%, rye meal 33⅓%, graphite 16⅔%, red lead 10%, and asbestos 10%.

In testimony whereof I have signed my name to this specification in the presence of two subscribing witnesses.

JOSEPH M. JOHNSON.

Witnesses:
J. E. WILLETT,
A. L. KAVANAGH.